No. 735,517. PATENTED AUG. 4, 1903.
C. W. HUNT.
FRICTION CLUTCH.
APPLICATION FILED APR. 17, 1902.

NO MODEL.

Attest:
A. N. Jesbera
M. A. Brayley.

Inventor:
Charles Wallace Hunt
by Redding, Kiddle & Greeley
Attys.

No. 735,517. Patented August 4, 1903.

UNITED STATES PATENT OFFICE.

CHARLES W. HUNT, OF WEST NEW BRIGHTON, NEW YORK.

FRICTION-CLUTCH.

SPECIFICATION forming part of Letters Patent No. 735,517, dated August 4, 1903.

Application filed April 17, 1902. Serial No. 103,259. (No model.)

*To all whom it may concern:*

Be it known that I, CHARLES WALLACE HUNT, a citizen of the United States, residing in West New Brighton, borough of Richmond, city of New York, State of New York, have invented certain new and useful Improvements in Friction-Clutches, of which the following is a specification, reference being had to the accompanying drawings, forming a part hereof.

In friction-clutches having drums and hoisting and conveying apparatus the friction material—such as wood, leather, &c.—is generally secured to the external surface of one of the clutch members, while the coöperating metal surface of the other clutch member is internal. As is well understood by those familiar with hoisting apparatus of this character, the metal clutch member becomes very hot in use, expanding when heated and contracting when cooled, so that when the clutch members are left in contact after considerable use, as frequently happens, the outer metal clutch member contracts upon the inner member having the friction material and the two are so firmly locked together that it is difficult to separate them, the use of sledges being frequently necessary to separate them when starting up again. It is also well understood that owing to the heating above referred to and to the great pressure of one part against the other in hoisting apparatus designed for heavy loads one or the other of the clutch members is liable to be distorted, if not broken.

It is the object of this invention to provide a clutch for such uses the members of which shall not be liable to be locked together if they are allowed to cool in contact and shall not be liable to distortion or breakage through the heavy pressure of one member upon the other, and in accordance with the invention the friction material is applied to the internal surface of one of the clutch members and one or both of such members, as may be necessary, is or are so constructed as to resist the pressure without distortion.

The invention will be more fully described hereinafter with reference to the accompanying drawings, in which for purposes of explanation it is illustrated, and in which—

Figure 1:
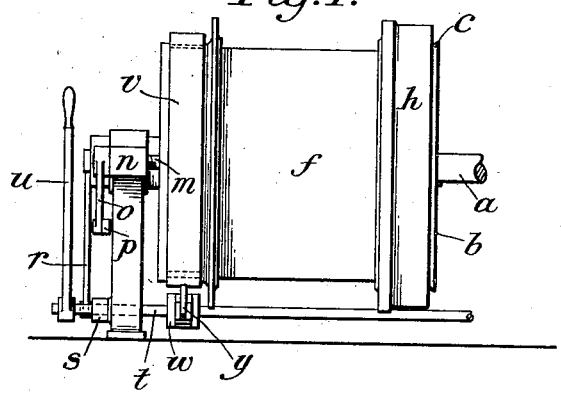
Figure 2:
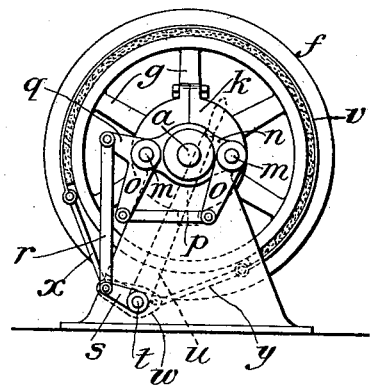
Figure 3:
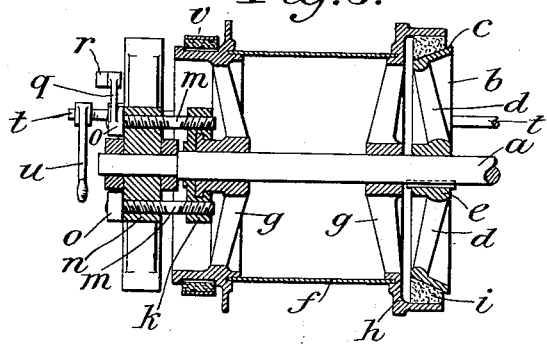

Figure 1 is a view in side elevation of a hoisting-drum to which the invention is applied. Fig. 2 is an end view of the same as seen from the left of Fig. 1, the clutch-operating handle being shown in dotted lines. Fig. 3 is a horizontal central section.

In the structure represented in the drawings the driving-shaft $a$ is represented as having keyed thereon the male clutch member $b$, the same having a tapered metal rim $c$, which is carried by arms $d$ from the hub $e$, the arms $d$ being inclined in a direction opposite to the direction of the thrust when the clutch members are engaged. Not only is the thrust thus more effectively resisted, but the expansion tends only to bring the arms into a plane at right angles on the axis of the shaft and not to distort the clutch members injuriously.

The drum $f$ is shown as mounted loosely on the shaft $a$ by spiders $g$, the arms of which are preferably inclined in opposite directions, substantially as represented. The female clutch member $h$ is secured to the drum in any convenient manner, as by being formed with one of the spiders $g$, and is adapted to surround the clutch member $b$, the friction material $i$ being disposed internally and formed to coöperate properly with the metal clutch-surface $c$ of the member $b$.

The clutch may be operated in any suitable manner. As represented in the drawings, the hub of one of the spiders $g$ is engaged loosely by a collar $k$, which is threaded to receive screw-shafts $m$, the other ends of said screw-shafts being oppositely threaded in the standard $n$. Short arms $o$ are secured to the screw-shafts and are connected by link $p$, one of such arms having a second arm $q$, which may be connected by a link $r$ with a short arm $s$ on a shaft $t$, to which is applied the operating-handle $u$. It will be understood that by moving the handle $u$ in one direction or the other the screw-shafts $m$ will receive a partial rotation to move the drum and the clutch member $h$ thereon toward or from the fixed clutch member $b$.

A suitable brake-band $v$ is arranged around the drum $f$, which has a peripheral groove at one end, in which the band rests. Each end of this brake-band is connected to the ends of a block $w$, fast upon shaft $t$, by links $x$ and $y$. The end of the block $w$ to which link $x$ is connected is larger than the end to which link *y* is connected, and both ends are forked, so as to receive conveniently the links. In Fig. 2 the positions of the brake-band, the lever *u*, the block *w*, and its intermediate connections with the brake-band are illustrated as they appear when the lever *u* has been moved to bring the clutch member *h* into engagement with the fixed clutch member *b*, and it will be obvious that when the handle *u* is moved in the opposite direction (which will cause shaft *t*, Fig. 2, to turn in a counter-clockwise direction) block *w* will draw the links *x* and *y* toward each other, thereby drawing the band *v* tightly around the drum *t*, and as the clutch is thrown out simultaneously the drum is braked and brought to a quick stop.

It will be obvious that in use the female clutch member *h* is insulated by the friction material *i* and will not become very hot, and therefore will not expand materially, and although the male clutch member *b* may become hot and expand while in use nevertheless upon cooling it will contract away from the other clutch member, so that no locking of the clutch members through permitting them to cool in contact can occur.

I claim as my invention—

1. The combination of a driving-shaft, a drum mounted loosely thereon, a female clutch member secured to said drum, friction material secured within said female member, a male clutch member fixed on said shaft and having a metal rim to coöperate with said friction material, a collar loosely engaging the hub of said drum, a standard, screw-shafts having oppositely-threaded ends carried by said standard and engaging said collar and means to actuate said screw-shafts, substantially as described.

2. The combination of a driving-shaft, a drum mounted loosely thereon, a female clutch member secured to said drum, friction material secured within said female member, a male clutch member fixed on said shaft and having a metal rim to coöperate with said friction material, a collar loosely engaging the hub of said drum, a standard, screw-shafts having oppositely-threaded ends carried by said standard and engaging said collar, means to actuate said screw-shafts, and a brake-band around said drum also actuated by said means, substantially as described.

This specification signed and witnessed this 12th day of April, A. D. 1902.

CHAS. W. HUNT.

In presence of—
WM. F. HUNT,
CHAS. E. SIMONSON.